United States Patent
da Silva (12)

(10) Patent No.: US 6,496,703 B1
(45) Date of Patent: Dec. 17, 2002

(54) SYSTEM FOR DISABLING WIRELESS COMMUNICATION DEVICES

(75) Inventor: Ivan Pereira da Silva, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/453,857

(22) Filed: Dec. 13, 1999

(51) Int. Cl.[7] .................................................. H04Q 7/20
(52) U.S. Cl. ........................ 455/456; 455/422; 455/575; 455/1; 340/681.1; 340/681.6; 379/70
(58) Field of Search .............................. 455/1, 404, 411, 455/422, 575, 456; 340/686.1, 686.6; 379/70

(56) References Cited

U.S. PATENT DOCUMENTS

| | | | |
|---|---|---|---|
| 5,235,633 A | * 8/1993 | Dennison et al. | 379/60 |
| 5,442,805 A | * 8/1995 | Sagers et al. | 455/33.1 |
| 6,011,973 A | * 1/2000 | Valentine et al. | 455/456 |
| 6,073,006 A | * 6/2000 | Sawyer et al. | 455/410 |
| 6,085,096 A | * 7/2000 | Nakamura | 455/456 |
| 6,128,485 A | * 10/2000 | Mori et al. | 455/422 |
| 6,201,973 B1 | * 3/2001 | Kowaguchi | 455/456 |
| 6,222,458 B1 | * 4/2001 | Harris | 340/686.6 |
| 6,246,861 B1 | * 6/2001 | Messier et al. | 455/12.1 |

FOREIGN PATENT DOCUMENTS

| | | | | |
|---|---|---|---|---|
| WO | WO 99-07167 | * | 2/1999 | H04Q/7/22 |
| WO | WO 99-55102 | * | 10/1999 | H04Q/7/20 |

OTHER PUBLICATIONS

Tom Clancy, "Rainbow Six", 1998, G. P. Putnam's Sons (Penguin Putnam, Inc. 375 Hudson St. New York, NY. 100014) ISBN 0–399–14413–7, p. 501).*

* cited by examiner

*Primary Examiner*—Daniel Hunter
*Assistant Examiner*—Stephen D'Agosta
(74) *Attorney, Agent, or Firm*—Harness, Dickey & Pierce, P.L.C.

(57) ABSTRACT

An apparatus and method for disabling wireless communication devices establishes a disabling zone. Inside the disabling zone, one or more capabilities of the wireless communication devices are disabled. The wireless communication devices may include cellular phones, beepers, pagers, portable computers, electronic personal attendants, and/or similar wireless devices. In a first embodiment, the zone is formed in conjunction with a power monitoring unit proximate the zone. In a second embodiment, the zone is formed in conjunction with a position monitoring system determining the geographical position of the wireless communication devices. In both the first and second embodiments, the zone may be either geographically fixed or moveable.

12 Claims, 6 Drawing Sheets

MEMORY OF PMU ADDRESSED AS: 01AC5

| ESN | INDICATED OPERATING POWER LEVEL | RECEIVED POWER LEVEL | NUMBER OF TIMES RECEIVED |
|---|---|---|---|
| A56CA | 8 | 90 | 2 |
| A78X5 | 9 | 92 | 3 |
| FA017 | 6 | 87 | 1 |

SYSTEM FOR DISABLING WIRELESS COMMUNICATION DEVICES

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

Cellular phones, beepers, pagers, portable computers, electronic personal attendants, and other wireless communication devices are an integral part of modern life. For instance, cellular phones offer convenience in our personal relationships and business dealings, by allowing us to stay in communication with the world in practically any public location. However, one person's convenience can be another person's annoyance.

Often, cellular phones ring and phone conversations occur, in some of the most inappropriate locations. For example, the peaceful enjoyment of a movie, play, or musical performance can be destroyed by the chirping of cellular phones in the audience. The concentration of students taking an exam or listening to a lecture can be broken by a cellular phone's ringing, or by another student's engagement in a conversation on a cellular phone. Also, a cellular phone can be disturbing to the public, and embarrassing to the cellular phone's owner, during church services, dining at a restaurant, or during quite times observed in public, such as opening prays, the pledge of allegiance, and the national anthem.

Often certain locations have restrictions, rules or laws forbidding the operation of cellular phones due to safety concerns. For example, it is illegal to operate wireless communication devices in airports and some train stations because of concerns that important communications controlling the operations of the airplanes and trains will be interrupted or distorted. Also, some schools forbid students to use cellular phones or beepers on school grounds, in order to reduce the likelihood of drug trafficking and gang activity. Further, many commercial and governmental establishments, such as theaters, libraries and courtrooms, restrict the use of cellular phones, beepers, and other types of wireless communication devices in order to avoid disruptions. In these restricted locations, the cellular phone user has discretion to abide by, or ignore, the rules, requests or public etiquette curtailing the use of wireless communication devices.

FIELD OF THE INVENTION

This invention relates to communications, and specifically to wireless communications.

BRIEF SUMMARY OF THE INVENTION

It is an object of the present invention to provide an apparatus and method which removes the public's discretion to ignore rules and requests forbidding the use of wireless communication devices in specific locations.

It is a further object of the present invention to provide an apparatus and method for disabling some or all of the functions of wire communication devices in specific locations, at specific times or continuously.

Further, it is an object of the present invention to provide an apparatus and method, useable by law enforcement and military personnel, to cutoff the communications abilities of persons, such as hijackers, hostage takers, and fleeing suspects, in specific fixed or moving areas.

These and other objects are achieved by an apparatus and method for establishing a disabling zone, wherein one or more capabilities of wireless communication devices inside the zone are disabled. The wireless communication devices may include cellular phones, beepers, pagers, portable computers, electronic personal attendants, and/or similar wireless devices. In a first embodiment, the zone is formed in conjunction with a power monitoring unit proximate the zone. In a second embodiment, the zone is formed in conjunction with a position monitoring system determining the geographical positions of the wireless communication devices. In both the first or second embodiments, the zone may be either geographically fixed or moveable.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
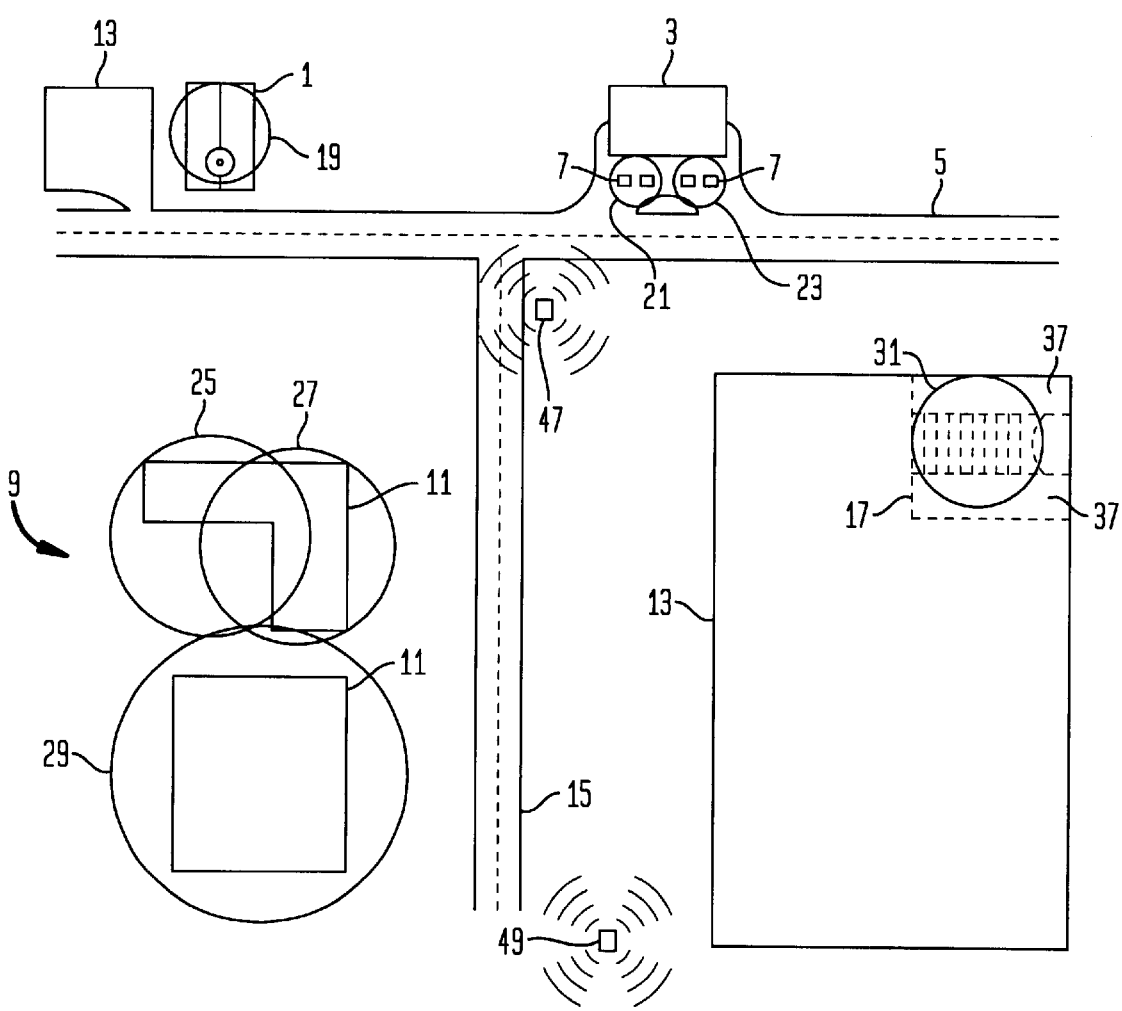
FIG. 1 is an overhead view of a section of a city illustrating fixed disabling zones, in accordance with the present invention.

FIG. 1 is an overhead view of a section of a city illustrating the use of the apparatus of the present invention. In FIG. 1, a church 1 and a gas station 3 are located along a first road 5. The gas station 3 includes a plurality of gas pumps 7. Buildings 11 of a school campus 9 and a mall 13 are located along a second road 15. The mall 13 includes a theater 17. First, second, third, fourth, fifth, sixth, and seventh zones 19, 21, 23, 25, 27, 29, 31 have been established wherein cellular communications are prohibited.

The church 1 includes the first zone 19. The first zone 19 completely covers a sanctuary inside the church, but does not include a lobby area in the front of the church or a parking lot 33 of the church 1. Further, the first zone 19 does not extend off the private grounds of the church 1, as for example into the first road 5.

The gas station 3 includes the second and third zones 21, 23 which surround the gas pumps 7. The second and third zones 21, 23 are provided to cover the possible parking locations of vehicles being fueled. The second and third zones 21, 23 may have been established in response to a local ordinance forbidding the use of cellular phones while fueling a vehicle, or at the behest of the gas station owner in order to speed the fueling process at the gas pumps 7.

The student lecturing and examination areas of school campus 9 are covered by the fourth, fifth and sixth zones 25, 27, 29, which completely cover the buildings 11 and partially overlap each other. The theater 17 in the mall 13 is covered by the seventh zone 31. The seventh zone 31 completely covers a movie viewing area of the theater 17, and partially covers two adjacent areas 37. However, the seventh zone 31 but does not cover any other portions of the mall 13.

Figure 2:
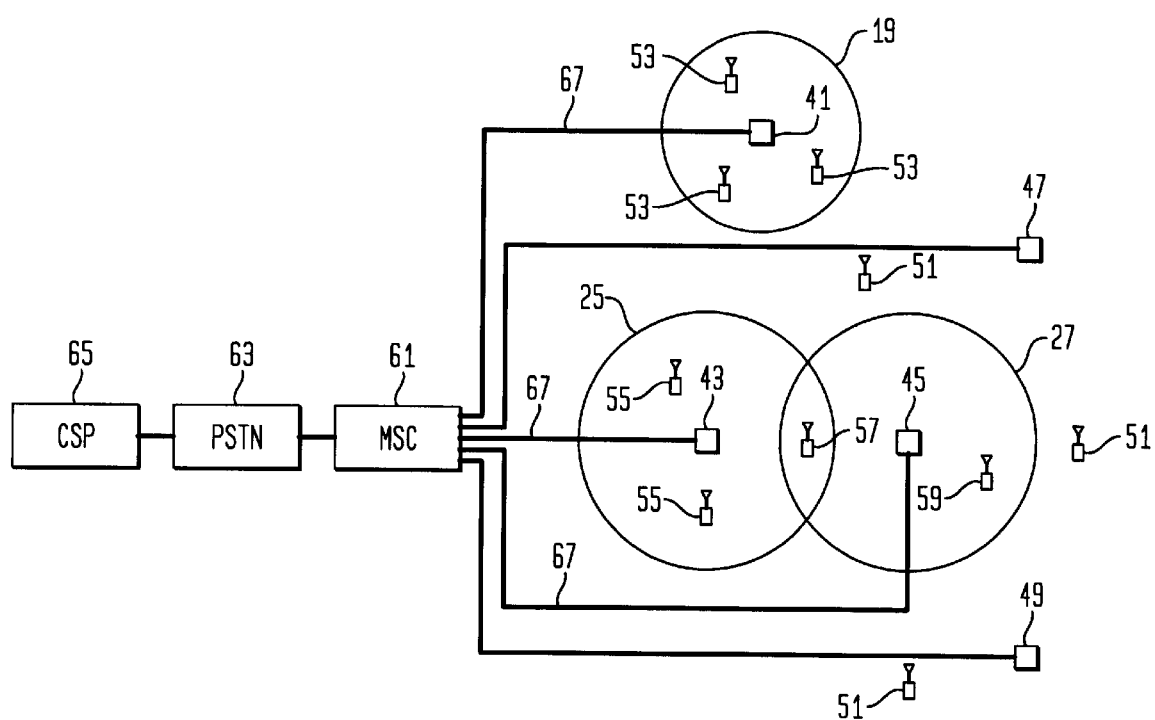
FIG. 2 is a block diagram illustrating components of an apparatus of the present invention.

Now, with reference to FIG. 2, components forming an embodiment of the apparatus of the present invention will be discussed. FIG. 2 illustrates the first, fourth and fifth zones 19, 25, 27. Proximate the center of each zone is a respective first, fourth and fifth power monitor unit (PMU) 41, 43, 45. Second, third, sixth and seventh PMUs would be provided inside the second, third, sixth and seventh zones 21, 23, 29, 31, respectively.

A first base station 47 and a second base station 49 are provided along the second roadway 15 (see FIG. 1). Reference numeral 51 indicates a plurality of cellular phones outside of any particular zone. Reference numeral 53 indicates cellular phones inside the first zone 19. Reference numeral 55 indicates cellular phones inside the fourth zone 25. Reference numeral 57 indicates a cellular phone inside the fourth zone 25 and the fifth zone 27. Reference numeral 59 indicates a cellular phone inside the fifth zone 27. The first and second base stations 47, 49 are connected to a mobile switch center (MSC) 61. The MSC 61 is connected to one or more cellular service providers (CSP) 65 via a public system telephone network (PSTN) 63.

In operation, the first and second base stations 47, 49 send and receive radio signal communications with a plurality of cellular phones. The radio signal communications include transmissions of an electronic serial number (ESN) from the particular cellular phones transmitting, as well as, an indication of the operating power of the particular cellular phones.

The base stations 47, 49 communicate with the MSC 61, which receives the ESN signal, operating power signal, and data or voice signals. The MSC 61 monitors a reception power level of the incoming signals of a particular cellular phone, in light of the particular cellular phone's operating power signal. The MSC 61 causes the cellular phone to be "handed off" to another base station when the reception power level drops to a predetermined level, and a better reception power level is available from another base station. The MSC 61 cooperates with the PSTN 63 and the CSP 65 so that the data and voice signals are communicated, while details specific to the call are accumulated and logged in the CSP 65 for billing purposes. The basic operations of the base stations 47, 49, the MSC 61, the PSTN 63, and the CSP 65, as described above, are well known in the art.

The first PMU 41 is a receiver, which is structured to interface with the wireless communication devices, desired to be controlled in the first zone 19. For example, if the first zone 19 were intended to control cellular phones, the first PMU 41 would be designed to interface with cellular communications of the code division multiple access (CDMA) type. Of course, a PMU could be designed to interface with any type of wireless communications, such as time division multiple access (TDMA), frequency division multiple access (FDMA), etc. Moreover, a PMU could be designed to simultaneously interface with more than one type of wireless communications, if the expense were justified.

Figure 3:
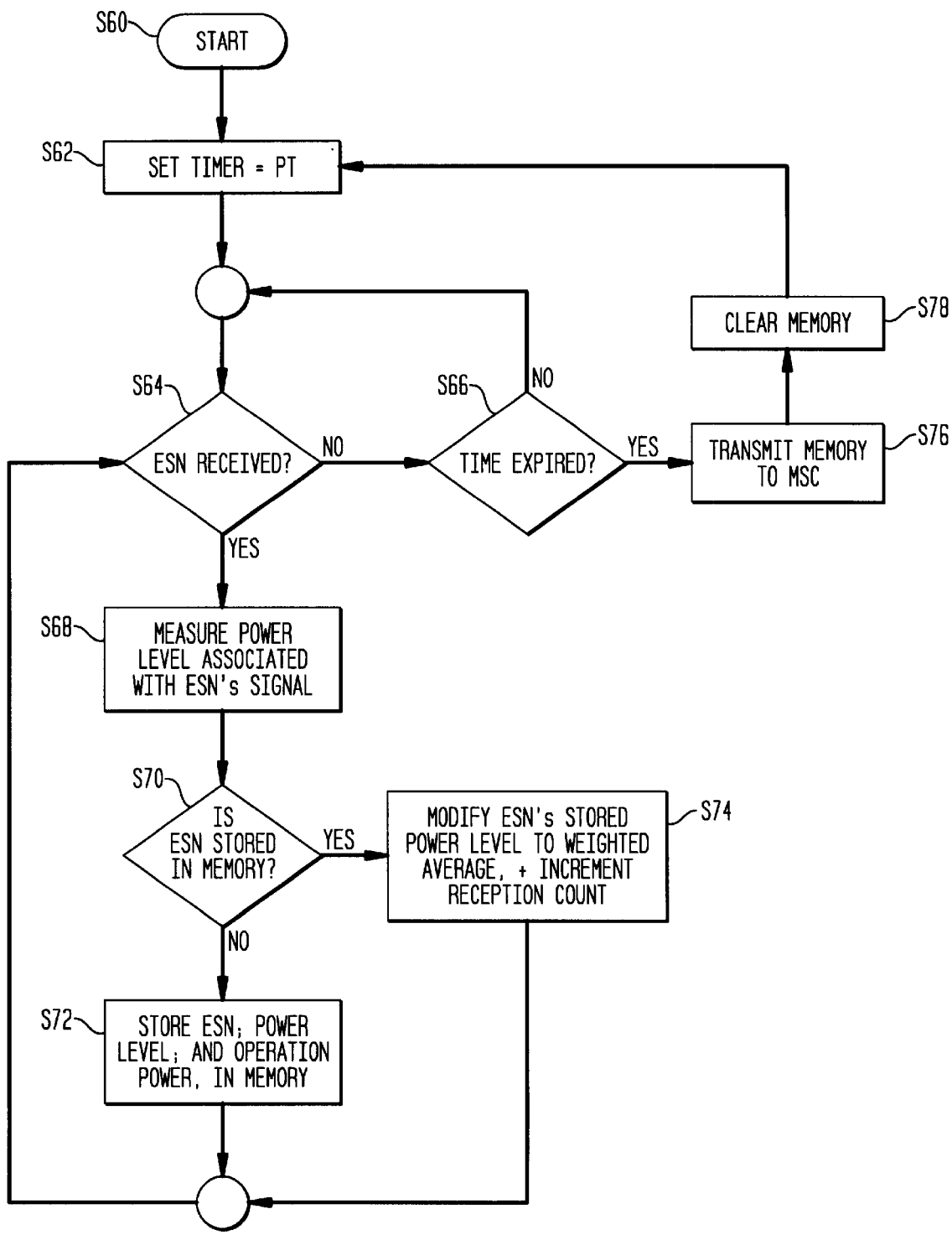
FIG. 3 is a flow chart illustrating a manner of operation of a power monitoring unit.

One possible manner of operation of a typical PMU, monitoring cellular phones, is illustrated in the flow chart of FIG. 3. Processing starts in step S60. In step S62, a timer is set equal to a predetermined time interval PT. Interval PT might equal, for example, 15 seconds.

In step S64, the PMU goes into a receiving mode wherein it waits to receive an ESN of a cellular phone. If no ESN is received, the PMU checks the timer in step S66. If the timer has not expired, the PMU returns to the receiving mode of step S64. If the timer has expired, processing goes to step S76, to be explained later.

Once an ESN is received in step S64, processing goes to step S68. In step S68, the received signal, indicating the ESN, has its reception power level measured. Next, in step S70, a first memory location within the PMU, containing information relating to received ESNs, is accessed. If the ESN received in step S64 is not stored in the first memory location, processing goes to step S72. In step S72, the ESN, its reception power level determined in step S68, and a signal from the cellular phone indicating its operating power level are stored in the first memory location. Also, a number of receptions is set equal to one. If, in step S70, the ESN received in step S64 is present in the first memory location, processing goes to step S74.

In step S74, a stored reception power level relating to the ESN, is averaged in a weighted sense with the reception power level measured in step S68. This process can be explained with reference to an example in FIG. 4.

Figures 4, 5:
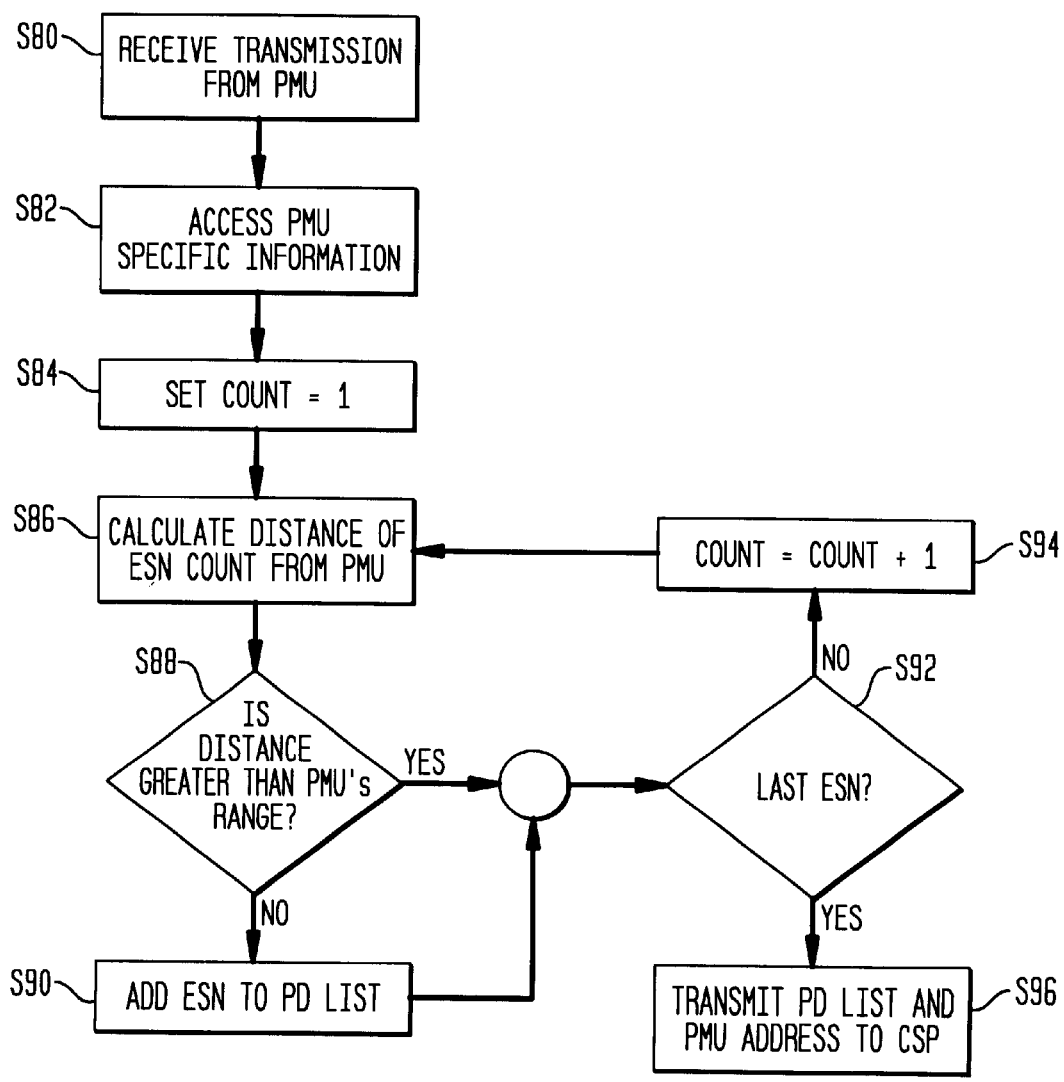
FIG. 4 is a table illustrating the contents of a first memory location within the power monitoring unit of FIG. 3.
FIG. 5 is a flow chart illustrating a manner of operation of a mobile switch center.

In FIG. 4, the memory location in the PMU includes an ESN, the indicated operating power level, the reception power level, and the number of times the ESN has been received during the interval PT established in step S62. Assume that an ESN of "A78X5" is received in step S64, and that its reception power level is measured as "88" in step S68. In step S70, it is determined that the ESN is present in the first memory (it is the second entry).

In step S74, the number of previous receptions of this ESN (in FIG. 4 three previous receptions) is multiplied by the stored reception power level (in this example "92"). The resultant "276" is added to the presently measured reception power level of "88", then divided by four to arrive at a weighted average reception power level of "91", which is substituted into the first memory for the previous weighted average of "92". Next, the number of receptions is incremented, in this case to equal four. Next, processing returns to the receiving mode of step S64.

In step S74, it would also be possible to average the stored indicated operating power level. However, it is unlikely that a particular cellular phone's operating power level would significantly decline during the interval PT, as set by the timer in step S62. Also, the numbers provided in this example are merely for explanation. In practice, the numbers associated with a cellular phone's reception power level and operating power level would vary and would depend upon the measurement units employed by the system, such as dbm or milliwatts.

If in step S66, the timer has expired, processing goes to the step S76. In step S76, the contents of the first memory location (FIG. 4) are sent to the MSC 61, along with the PMU's unique address (in the example of FIG. 4, the address is "01AC5"). Next, in step S78, the first memory location is cleared of all ESN related entries, and the processing returns to step S62, wherein the timer is reset to the interval PT.

Now, one possible manner of operation of a typical MSC will be described, with reference to the flow chart of FIG. 5. Processing starts in step S80. In step S80, the MSC receives the address of the PMU and the contents of the first memory location, which was sent by the PMU in step S76. The communications to the MSC occur over landlines 67 of FIG. 2. Alternatively, the communications from the PMU to the MSC may occur by a wireless phone call via a nearby base station. Also, the transmission may be via an internet email, a satellite transmission, a modem connection, or any other known manner of transmission. Preferably, the communications are encrypted.

In step S82, the MSC accesses a second memory location within the MSC, using the PMU's address. The second memory location contains information specific to the PMU. One portion of the information is the range of the disabling zone relating to the PMU. In other words, how far out does the disabling zone of the PMU extend. For example, in FIG. 1, it can be seen that the range of the first PMU 41, associated with the first zone 19, is considerably smaller than the range of the fourth PMU 43, associated with the fourth zone 25.

Next, in step S84, a count variable is set equal to one. In step S86, the MSC calculates the approximate distance between the PMU and the cellular phone relating to the ESN entry, "count", in the contents of the received first memory. This calculation occurs by evaluating the reception power level of the ESN entry, in light of the particular phone's transmitted operating power level. In other words, by knowing the operating power level of the cellular phone, the MSC can approximate the distance between the cellular phone and the PMU based upon the measured reception power level, which declines by at least the square of the distance between the PMU and the cellular phone. This type of calculation is known in the art, and occurs during such processes as "handling off" a cellular phone from one base station to another.

Next, in step S88, the calculated distance is compared to the range for the PMU. If the distance is less than or equal to the range, processing goes to step S90 wherein the ESN is added to the second memory location within the MSC to a "potential disable" (PD) list. Next, processing goes to step S92. If the distance is greater than the range, processing goes directly to step S92.

In step S92, it is determined whether the last ESN entry has been evaluated. If not, the count is increment in step S94, and the next ESN entry is evaluated. If the last ESN entry has been evaluated, processing goes to step S96 and the "potential disable" list and address of the PMU is transmitted to the CSP 65 via the PSTN 63.

Figure 6:
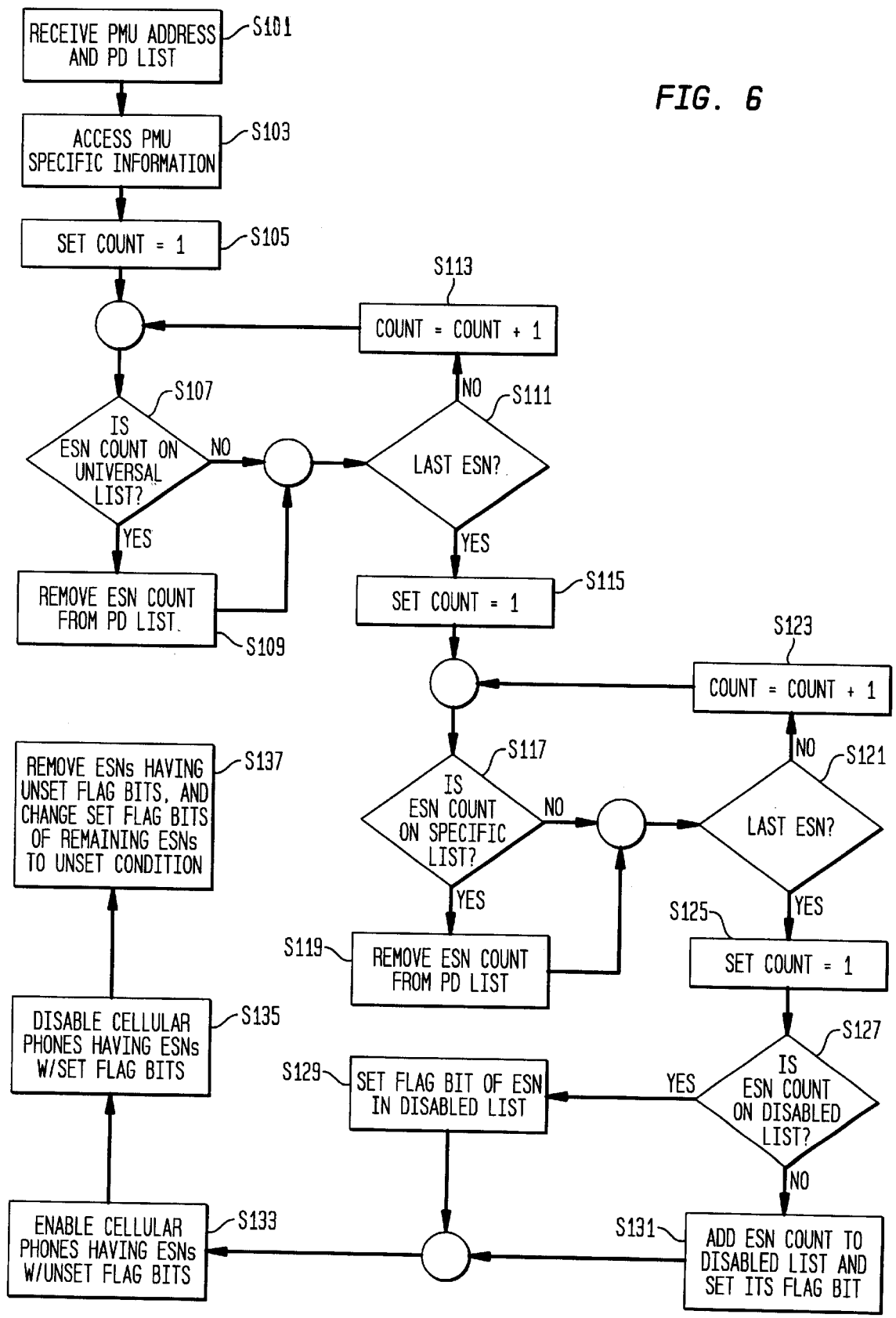
FIG. 6 is a flow chart illustrating a manner of operation of a cellular service provider.

Now, one possible manner of operation of a typical CSP will be described, with reference to the flow chart of FIG. 6. Processing starts in step S101. In step S101, the CSP receives the address of the PMU and the PD list. In step S103, the CSP accesses a third memory location within the CSP, using the PMU's address. The third memory location contains information specific to the PMU, as will be discussed later. In step S105, a count variable is set equal to one.

Next, in step S107, the CSP compares the ESN (numbered "count" in the PD list) to a "universal" list stored in the CSP. The "universal" list contains the ESNs of cellular phones belonging to law enforcement and military personnel, doctors, firemen, utility repair crews, and other persons deemed to have cellular phones which should not be disabled. If an ESN on the PD list is present on the "universal" list, the ESN is removed from the PD list in step S109.

After the ESN is removed from the PD list in step S109, or after the ESN is determined to be absent from the "universal" list in step S107, a determination is made as to whether the last ESN of the PD list has been evaluated in step S111. If the last ESN has not been evaluated, the count is incremented in step S113 and processing returns to step S107. If the last ESN has been evaluated, processing goes to step S115. In step S115, the count variable is reset equal to one.

Next, in step S117, the CSP compares the ESN (numbered "count" in the PD list) to a "specific" list stored in the CSP in the third memory location, specific to the address of the PMU. If, in step S117, an ESN on the PD list is present on the "specific" list, the ESN is removed from the PD list in step S119.

The "specific" list contains the ESNs of cellular phones belonging to persons authorized to use a cellular phone in the zone associated with the particular PMU. For example, in the fourth zone 25 which surrounds a portion of the school campus 9, the employees of the school, such as the principal, teachers, and janitors, would not necessarily need to have their cellular phones disabled. Therefore, the "specific" list for the fourth, fifth, and sixth PMUs would include the ESNs of the cellular phones owned, or operated, by school employees authorized to use cellular phones on school grounds.

After the ESN is removed from the PD list in step S119, or after the ESN is determined to be absent from the "specific" list in step S117, a determination is made as to whether the last ESN of the PD list has been evaluated, in step S121. If the last ESN has not been evaluated, the count is incremented in step S123 and processing returns to step S117. If the last ESN has been evaluated, processing goes to step S125 In S125, the count variable is again reset equal to one.

Next, in step S127, the CSP compares the ESN (numbered "count" in the PD list) to a "disabled" list stored in the CSP in the third memory location, specific to the address of the PMU. The "disabled" list includes all of the ESNs which were previously disabled by the CSP, during the last submission of a PD list for the specific PMU. The "disabled" list also includes a flag bit associated with each of the ESNs on the list.

If, in step S127, an ESN on the PD list is present on the "disabled" list, in step S129 the flag bit associated with the ESN is placed in a set condition. If in step S127, an ESN on the PD list is not present on the "disabled" list, in step S131, the ESN is added to the "disabled" list and the flag bit associated with that ESN is placed in the set condition.

Next in step S133, all of the ESNs on the "disabled" list having unset flag bits are processed by the CSP such that the cellular phones associated with those ESNs are enabled.

Next, in step S135, all of the ESN on the "disabled" list having set flag bits are processed by the CSP such that the cellular phones associated with those ESNs are disabled.

Next, in step S137, all ESN on the "disabled" list having unset flag bits are removed from the "disabled" list, and all ESN on the "disabled" list having set flag bits (i.e. all remaining ESNs), have their flag bits changed to the unset condition. By the process of steps S125 through S137, the CSP reactivates cellular phones leaving the zone of the PMU, continues to deactivate cellular phones remaining in the zone, and deactivates cellular phone entering the zone.

The above method of operation is only illustrative of one way in which to implement to the general principals of the present invention. It would, of course, be possible to modify the various method steps and ordering of method steps, while still achieving an overall method and apparatus in accordance with the present invention.

For example, the first, second, and third memory locations need not be separate locations. It would be possible to have the memory requirements satisfied by a single memory located in the CSP, which could be accessed by the PMU and MSC. The comparison of the PD list to the "universal" list could occur after the comparison of the PD list to the "specific" list.

As another example, the distance calculation of step S86 need not take place in the MSC. The distance calculation could take place in the PMU. Under this circumstance, the PMU would form the initial PD list for transmission to the MSC, or directly to the CSP.

As another example, the PMU need not transmit the ESN information in bursts to the MSC. Instead, the PMU could send individual ESN information to the MSC, as each ESN is received. Here, either the MSC or the CSP would monitor whether a sufficient time had past since the last receipt of a particular ESN to determine that the cellular phone related to the particular ESN had left the zone of the PMU and should be reactivated.

The CSP need not completely disable cellular phones within the zone of the PMU. It would be an option to partially disable the cellular phone. For example, incoming calls could be prohibited, while permitting outgoing calls from cellular phones within the zone. This would eliminate ringing of cellular phones within the zone. Also, the system could be used to prohibit outgoing calls while allowing incoming calls, if desired.

Another, variation is to keep a record of cellular phones having vibrating announcers, rather than ringing announcers. The ESNs of such cellular phones could be added to the "specific" list, or the "universal" list, if the system were designed to only prohibit the ringing of cellular phones in a particular zone, or all zones, respectively.

Although FIG. 2 illustrates the PMUs in the approximate centers of the zones, it is foreseeable that the PMUs could be fully or partially reception directional. Therefore a PMU could be located along an edge of its zone, or at least off center of its zone. Further, although the zones have been illustrated as circular in FIGS. 1 and 2, the zones would have somewhat irregular shapes due to manmade and natural barriers, which influence wireless transmissions.

Also, although FIG. 2 illustrates PMUs, it would be possible to eliminate the PMUs and instead rely on a position monitoring system, such as the global positioning system (GPS), a wireless assisted GPS, or any type of time delayed signal analysis system. Many position monitoring systems are known in the art whereby an approximate position of a cellular phone can be determined by evaluating the communications of that cellular phone, as received by one or more base stations. The position monitoring system establishes a coordinate system from a reference point. The perimeters of the zones could be established in the coordinate system, such as by a function having the coordinates as variables.

By knowing the positional data of a cellular phone seeking to perform a communication, and by knowing the position data of the established disabling zones, the remainder of the methods disclosed and claimed in the present invention, would be applicable. For instance, if the positional data of a cellular phone placed it in the first zone 19, the CSP would evaluate the "specific" list of the first zone and "universal" list to determine if the cellular communication should be enabled.

There are many variations concerning the possible ways to use the disabling system of the present invention. In some circumstances, there is no need to control cellular phones during all times within a particular zone. For example, there may exist no need to disable cellular phones on school grounds after school hours, or for that matter during a lunch hour. Along this line, there may be no need to disable cellular phones on church grounds except for on Sundays, or perhaps Sundays between the hours of 10am till 1pm and 5pm till 8pm.

Under these circumstances, the PMU could be programmed to power up at a start time, and to send out a no ESNs present signal (in order to enable any disabled ESNs) and go to a stand-by power state at a stop time. Alternatively, the CSP could be programmed to allow a certain PMU to disable cellular phones only during certain times.

The "specific" list and cellular phone capabilities which are disabled could also be changed frequently, if desired. In other words, a business could allow only incoming cellular calls during certain hours, and prohibit outgoing cellular calls during other hours. Further, it would be possible for the "specific" list to include different restrictions for different ESNs. For example, only the principal's cellular phone is allowed to ring during school hours, whereas the teachers' and janitors' phones will not ring during school hours, but are permitted to make outgoing calls.

The CSP could also be programmed such that prior to disabling a particular cellular phone, the CSP checks to see if a call is presently being conducted on the particular cellular phone. If a call is being conducted, the CSP could allow the call to continue, and then disable one or more features of the cellular phone after termination of the call. Alternatively, the CSP could cause a message to be heard by the cellular phone user, or both parties involved in the call. The message could indicate that the cellular phone has entered a prohibited zone, and that the call will be terminated in a few seconds or minutes, unless the cellular phone leaves the prohibited zone.

It would be possible for a business to generally prohibit incoming and outgoing cellular phone calls on the business property, while permitting (either for free or for a charge) incoming or outcome phone calls to select customers. Under this arrangement, the business could communicate with the CSP, such as by telephone or the internet, and submit and remove ESNs from their "specific" list. Therefore, the "specific" list could change on a real time basis.

It is also possible to have the "universal" list change on a real time basis. For example, a doctor's cellular phone's ESN could be present on the "universal" list only when the doctor is "on call", but excluded from the "universal" list at all other times. A police officer's cellular phone could be present on the "universal" list when the officer is on duty, but excluded from the "universal" list at all other times.

Figure 7:
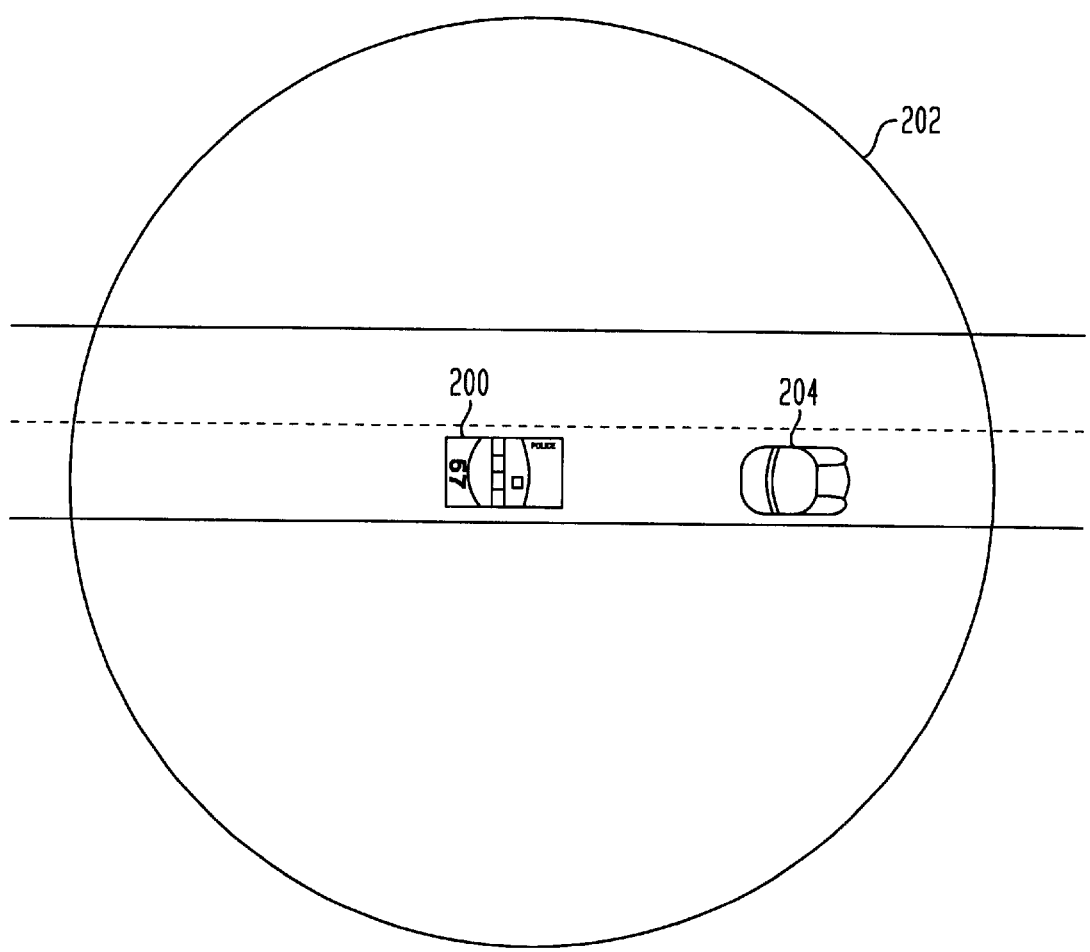
FIG. 7 is an overhead view of a police car carrying a mobile power monitoring unit, in order disable a geographically moving zone.

FIG. 7 illustrates a special use for the disabling system, according to the present invention. In FIG. 7, the PMU is attached to a law enforcement or military vehicle 200. Although the vehicle is illustrated as a car, it is envisioned that the vehicle 200 could be a motorcycle, boat, airplane, helicopter, robot, missile, etc. Also, it is envisioned that the PMU could be handheld. Of course, when the PMU is mobile, the communications between the PMU and the MSC would take place via a wireless medium.

In FIG. 7, a zone 202 of the PMU surrounds the vehicle 200 and extends some distance away, for example two hundred feet. The zone 202 is not fixed, but rather moves geographically, as the vehicle 200 moves, or alternatively, as a person carries the PMU. The PMU has the advantage that the police or military may activate this system to disrupt or prohibit any cellular phone call made inside the zone 202. Such as by the cellular phone inside the car 204 being pursed.

One possible use of the system of FIG. 7 would be by the secret service to protect a moving area surrounding a motorcade. Another possible use would be to carry the PMU to the sight of a high-jacking or hostage situation, in order to control a suspect's ability to use a cellular phone in the furtherance of the criminal act.

In all of the above scenarios, a person calling a disabled phone could be routed to a special message stating that the cellular phone is located in a prohibited area and cannot be contacted at this time. Then, the caller could be routed into the cellular phone's message mail box.

There is, of course, a concern that an emergency call would not be able to be made to a cellular phone within a disabling zone. Therefore, it would be possible to have a message ask the caller if an emergency exists, and if so to press a number on the key pad. Then, the caller could be handled by a service person or automatically. Next, the CSP would enable the cellular phone within the disabling zone and complete the call. If the call was not an emergency, a fee or fine could be imposed, in a manner similar to maliciously calling 911.

Typically, an outgoing call attempted by a cellular phone within a disabling zone would appear to be out of range. Alternatively, an outgoing call could be sent to a recorded message explaining that the cellular phone is located in a restricted area and cannot be used. In order to allow outgoing emergency calls from cellular phones inside of a disabling zone, the CSP could always allow 911 calls to be processed in a normal manner.

If desired, a PMU employed by law enforcement or the military could establish a zone, which is difficult to detect by the public. In such a zone, a person calling from a cellular phone might hear a recorded message that indicates that all circuits are busy and that the call should be attempted at a later time, or some other standard recording. In the case of an incoming call to the cellular phone, the caller might hear a message that the cellular phone is turned off or out of range, or some other standard recording. Thus, the disablement established by the PMU illustrated in FIG. 7 could be transparent to the public, and not easily discernable as a purposeful blockage of cellular phone activities.

Although the above disclosure has focused on cellular phones, it should be readily apparent that the present invention is equally applicable to pagers, beepers, electronic personal attendants, person computers, or any other type of wireless device.

What is claimed is:

1. A method of controlling operational capabilities of wireless communication devices, comprising:

monitoring wireless communication devices in a moving zone;

disabling operational capabilities of at least one monitored wireless communication device in the moving zone.

2. The method of claim 1, wherein the monitored wireless communication devices include wireless phones.

3. The method of claim 2, wherein the disabling step prevents the processing of a call originating from at least one monitored wireless phone.

4. The method of claim 2, wherein the disabling step prevents calls from being sent to at least one monitored wireless phone.

5. The method of claim 1, wherein the monitoring step monitors identities of wireless communication devices in the moving zone; and the disabling step disables operational capabilities of at least one of the wireless communication devices in the moving zone based on the monitored identities.

6. The method of claim 5, wherein the monitored identities are electronic serial numbers.

7. An apparatus for controlling operation capabilities of wireless devices, comprising:

a monitor monitoring wireless communication devices in a moving zone; and a processing system disabling operational capabilities of at least one monitored wireless communication device in the moving zone.

8. The apparatus of claim 7, wherein the monitored wireless communication devices include wireless phones.

9. The apparatus of claim 8, wherein the processing system prevents the processing of a call originating from at least one monitored wireless phone.

10. The apparatus of claim 8, wherein the processing system prevents calls from being sent to at least one monitored wireless phone.

11. The apparatus of claim 7, wherein the monitor monitors identities of wireless communication devices in the moving zone; and the processing system disables operational capabilities of at least one of the wireless communication devices in the moving zone based on the monitored identities.

12. The apparatus of claim 11, wherein the monitored identities are electronic serial numbers.

* * * * *